United States Patent
Dockendorf et al.

(10) Patent No.: US 10,572,795 B1
(45) Date of Patent: Feb. 25, 2020

(54) PLASTIC HYPER-DIMENSIONAL MEMORY

(71) Applicant: HRL Laboratories, LLC, Malibu, CA (US)

(72) Inventors: Karl P. Dockendorf, Jacksonville, FL (US); Charles E. Martin, Thousand Oaks, CA (US); Dean C. Mumme, San Marcos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 955 days.

(21) Appl. No.: 15/156,012

(22) Filed: May 16, 2016

Related U.S. Application Data

(60) Provisional application No. 62/161,491, filed on May 14, 2015.

(51) Int. Cl.
*G06N 3/04* (2006.01)

(52) U.S. Cl.
CPC .................................... *G06N 3/04* (2013.01)

(58) Field of Classification Search
CPC ....................................................... G06N 3/04
See application file for complete search history.

(56) References Cited

PUBLICATIONS

Ratitch, Bohdana, and Doina Precup. "Sparse distributed memories for on-line value-based reinforcement learning." European Conference on Machine Learning. Springer, Berlin, Heidelberg, 2004. (Year: 2004).*
Kanerva, Pentti. "Sparse distributed memory and related models." (1992). (Year: 1992).*
Pentti Kanerva, "Hyperdimensional Computing: An Introduction to Computing in Distributed Representation with High-Dimensional Random Vectors," Cognitive Computation, Jun. 2009, vol. 1, Issue 2, pp. 139-159, First online: Jan. 28, 2009.
S.B. Furber., G. Brown, J. Bose, J.M. Cumpstey, P. Marshall and J.L. Shapiro. Sparse Distributed Memory Using Rank-Order-Neural-Codes, IEEE Trans. On Neural Networks, vol. 18, No. 3, May 2007, pp. 648-659.
G.R. Rinkus, A Cortical Sparse Distributed Coding Model Linking Mini- Macrocolumn-Scale Functionality, Frontiers in Neuroanatomy, Jun. 2010, pp. 1-13.

* cited by examiner

*Primary Examiner* — Eric Nilsson
(74) *Attorney, Agent, or Firm* — Tope-McKay & Associates

(57) ABSTRACT

Described is a plastic hyper-dimensional memory system having neuronal layers. The system includes an input layer for receiving an input and an address matrix for generating a working pre-image vector from the input. A hidden layer is included for transforming the working pre-image vector into a working vector. A data matrix transforms the working vector into a data pre-image vector. Further, the hidden layer performs neurogenesis when a novel input is detected based on the working pre-image vector, where the neurogenesis comprises adding or deleting address units. Novelty detection includes using a set of reinforcement units. Finally, an output layer generates a data vector based on the data pre-image vector.

15 Claims, 8 Drawing Sheets

PLASTIC HYPER-DIMENSIONAL MEMORY

CROSS-REFERENCE TO RELATED APPLICATIONS

This is a non-provisional patent application of 62/161,491, filed on May 14, 2015, the entirety of which is hereby incorporated by reference.

BACKGROUND OF INVENTION (1) Field of Invention

The present invention is related to neural networks and, more particularly, to an associative neural network memory endowed with Reinforced Neurogenesis and the ability to indefinitely store new associations without forgetting previously stored information, and without saturating the memory.

(2) Description of Related Art

In machine learning, artificial neural networks are generally presented as systems of interconnected "neurons" which exchange messages between each other. The connections have weights that can be tuned based on experience, making neural nets adaptive to inputs and capable of learning. An associative neural network (ASNN) is a neural network that, using associative memory, includes a function and structure that operate similarly to the correlations in a human brain. An example of such an associative memory is the hyper-dimensional associative memory referred to as Kanerva's Sparse Distributed Memory (SDM) (see the List of Incorporated Literature References, Reference No. 1). Such an associative memory was improved upon Furber et al., in which the SDM was used to store data represented as N-of-M codes for improved storage capacity (see Literature Reference No. 2). Both the SDM and the use of N-of-M codes utilize hyper-dimensional vectors to represent data. Furber's work utilizes sparse data vectors to improve SDM storage capacity, and implements SDM as a bit-matrix representing neural connections for simplicity and high speed of the read/write algorithms. The use of N-of-M codes allows the memory to be (optionally) implemented as biologically plausible spiking neurons, and SDM in general has been identified as a hyper-dimensional model of the human cortex (see Literature Reference No. 3).

Current SDM, with or without the use of N-of-M codes, include several limitations. For example, memory is often limited to a predefined size which is unsuitable for continual storage of new data items over the lifetime of the application. Additionally, statistical correlations in the training data can overload portions of the SDM memory (local saturation) while starving others, resulting premature obsolescence of the storage medium. Further, the more items stored in memory, the worse it performs for classification of incomplete and noisy data. Importantly, there has been little research with regard to indefinite reuse of SDM memory without saturation or dynamic internal load balancing to eliminate premature memory obsolescence. Neural network research in recent decades has yet to produce a truly incremental and robust means of training new information without requiring retraining prior stored information.

Thus, a continuing need exists for an associative neural network memory endowed with the ability to indefinitely store new associations without forgetting previously stored information, and without saturating the memory.

SUMMARY OF INVENTION

Described is a plastic hyper-dimensional memory system having neuronal layers. The system includes an input layer for receiving an input (e.g., a numeric input, such as an address vector) and an address matrix for generating a working pre-image vector from the input. A hidden layer is included for transforming the working pre-image vector into a working vector. A data matrix transforms the working vector into a data pre-image vector. Further, the hidden layer performs neurogenesis when a novel input is detected based on the working pre-image vector, where the neurogenesis comprises adding or deleting address units. Novelty detection includes using a set of reinforcement units. Finally, an output layer generates a data vector based on the data pre-image vector.

In another aspect, the system includes a novelty detection algorithm, such that when an input is determined to be novel, an association between a working vector and data vector is trained to the data matrix, with a reinforcement unit tuned to recognize the association being added to the set of reinforcement units.

Further, when an input is determined to be novel, a number of address units in the hidden layer is increased.

Additionally, when the number of units in the hidden layer is increased, an address unit with a highest occupancy level is selected for replacement with two new units, such that a set of input connections to the original address unit is divided in half to form two disjoint sets of connections, and each new address unit is assigned one of the sets of connections.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
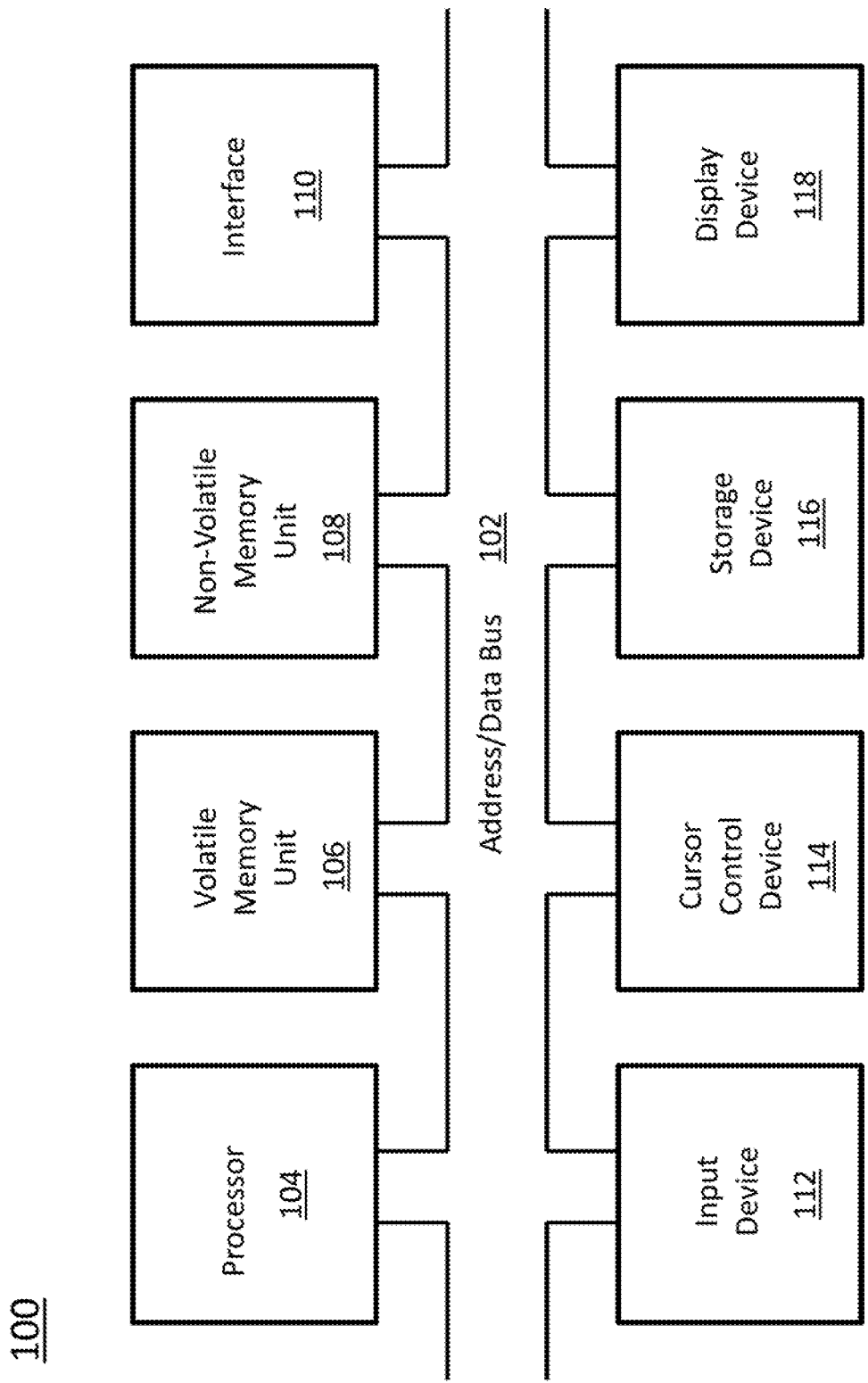
FIG. 1 is a block diagram depicting the components of plastic hyper-dimensional memory system according to various embodiments of the present invention.

The present invention is related to neural networks and, more particularly, to an associative neural network memory endowed with Reinforced Neurogenesis and the ability to indefinitely store new associations without forgetting previously stored information, and without saturating the memory. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Thereafter, specific details of various embodiment of the present invention are provided to give an understanding of the specific aspects. Finally, test results are provided to further provide specific examples and the corresponding results.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. P. Kanerva, Sparse Distributed Memory, MIT Press, 1988.
2. S. B. Furber., G. Brown, J. Bose, J. M. Cumpstey, P. Marshall and J. L. Shapiro. Sparse Distributed Memory Using Rank-Order-Neural-Codes, IEEE Trans. On Neural Networks, vol. 18, no. 3, May 2007.
3. G. R. Rinkus, A Cortical Sparse Distributed Coding Model Linking Mini- and Macrocolumn-Scale Functionality, Frontiers in Neuroanatomy, June, 2010.

(2) PRINCIPAL ASPECTS

Various embodiments of the invention include three "principal" aspects. The first is a plastic hyper-dimensional memory system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
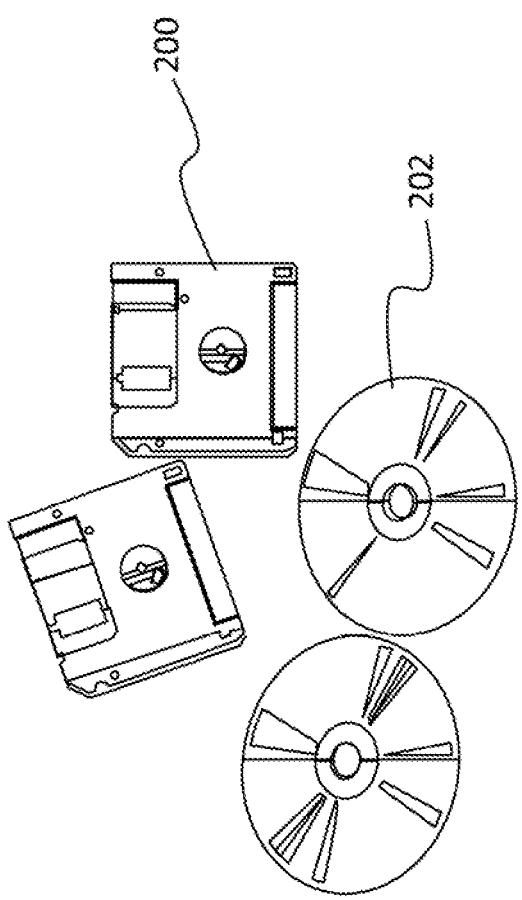
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a Plastic Hyper-dimensional Memory system, which is a particular type of associative neural network endowed with a new algorithm of Reinforced Neurogenesis. In this aspect, neural units are created and destroyed as necessary to provide a unique capability, called Enduring Reuse; which provides the ability to indefinitely store new associations without forgetting previously stored information, and without saturating the memory. Additionally, in various embodiments, the Reinforced Neurogenesis algorithm allows the memory to dynamically balance its storage load by eliminating "overloaded" neural units that, over time, have acquired higher than average connectivity in the course of repeated storage operations. Whenever a novel stimulus is learned (stored), the most overloaded neuron is replaced by two or more "new" units that preserve a proportion of the original's input and output connections. A new type of unit, called the reinforcement unit, specific to the novel pattern may then be emplaced in order to preserve memory of the new pattern even as the memory grows indefinitely.

Various embodiments provide hyper-dimensional memory with the ability to store an ever increasing set of stored items, potentially over the lifetime of the application, without saturating the memory. The advantages may include one or more of the following:

1. The ability to learn new data without forgetting previously learned information;
2. Enduring ability to store new information over the lifetime of the application without saturating (overloading) the memory;
3. Enduring capacity for continued adaptation in the presence of changing (non-stationary) environments and novel (or anomalous) information;
4. Requires no external (tuning) parameters for its operation; and
5. Memory load balancing may prevent long-term performance degradation.

The disclosure can serve any application domain requiring machine learning and recall. It may be applicable to domains such as: (1) autonomous vehicles, (2) automated robotic task planning, (3) safety systems, (4) prediction, and (5) distillation of knowledge from very large databases or high-bandwidth data-streams. The disclosure may be of particular benefit to application domains that require resilience to catastrophic failure in the presence of multi-point sensor and/or actuator failure. With its high capacity and ability to accommodate new information from a dynamic environment, the disclosure can serve complex systems such as vehicles and computer networks that can suffer from catastrophic failure mode that may arise from an innumerable array of potential combined sub-system failures.

(4) SPECIFIC DETAILS OF VARIOUS EMBODIMENTS

As noted above, this disclosure provides a Plastic Hyperdimensional Memory system, which is a particular type of associative neural network endowed with a new algorithm of Reinforced Neurogenesis. The Plastic Hyper-Dimensoinal memory system is derived from a variation of the Sparse Distributed Memory (SDM) of Kanerva (see the List of Incorporated Literature References, Reference No. 1), which is a biologically inspired, neural network type of memory that represents human neuronal activity as bit-vectors within a hyper-dimensional space (dimension ~10×, x at least 3). The variation utilizes sparse N-of-M codes as done by Furber et. al (see Literature Reference No. 2) to represent the neural activity of many thousands or potentially millions of units. Each code is an M-dimensional binary vector in which N of the bits are ones (representing currently active units) and the rest are zeros (inactive units). The codes are sparse in that N is much less than M, (N<<M), in order to model a neuronal system in which most units are inactive at any particular instant.

The Furber variant represents interconnections between neural units as a data matrix of binary-valued connection weights, one row of weights for each neural unit (data unit). Given a list of pairs of sparse binary vectors, each pair consisting of a prototype (the input vector) and a target (the desired output for that prototype), the matrix weights may be adjusted for each such pair using an outer-product rule (Hebbian rule). In various embodiments, for each prototype-target pair, this rule specifies that the $mn^{th}$ entry of the matrix is set to one when the nr component of the prototype and the $m^{th}$ component of the target are both one. The resulting matrix is a linear function that maps the prototype vector to an output vector that is nominally equal to the corresponding target. Each such mapping is called an association and adjusting the matrix to map a particular prototype to its target is called storing an association.

Many associations can be stored in a single data matrix, although the fidelity of the output degrades as more associations are stored. This gives rise to the concepts of memory capacity (how many associations can be stored) and loading (the percentage of this number). The former is reached when ~85-90% of the matrix weights have been changed from zero to one using the outer-product rule. Furber identifies the percentage of one-valued weights as the occupancy of the matrix. The occupancy is a key statistic exploited by this disclosure.

Figure 3:
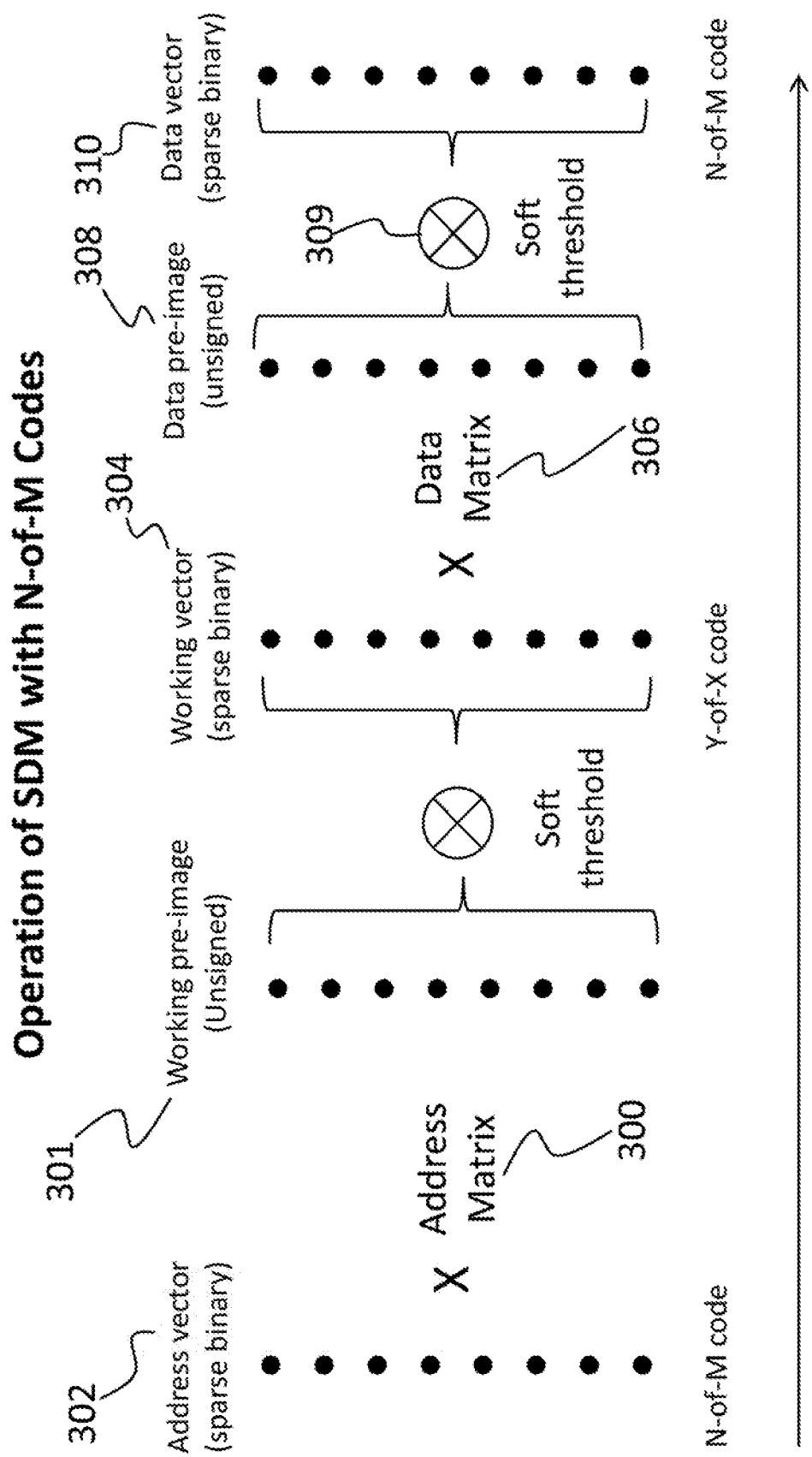
FIG. 3 is an illustration depicting operation of s Sparse Distributed Memory (SDM)

For the Furber variant of SDM (as shown in FIG. 3) an additional matrix, called the address matrix 300, is used as a "pre-processing stage" to map the sparse address vector 302 into a much higher dimensional (and sparsely coded) working vector 304 which is then used as input to the aforementioned data matrix 306. The address matrix 300 is determined in advance before any associations are stored; it remains fixed throughout the lifetime of the memory. Each row of the address matrix 300 represents an address unit which samples only N of the M input lines. Each address unit has M inputs, N of them have one-valued weights and the rest have a zero-valued weight, so that only N of the inputs are actually sampled. The set of one-valued lines is determined for each address unit randomly.

In various embodiments, the working vector 304 is then provided as input to the aforementioned data matrix 306, and an output is computed. In this type of memory, the prototype-target pairs each consist of a nominal address vector as the prototype, and the nominal output vector (data vector) as the target. As illustrated in the figure, the address vector 302 (numeric inputs) is multiplied by the address matrix 300 resulting in the working pre-image 301, which is a vector of positive values; each element is a count of how many one-valued input bits were seen at the input of a particular address unit. This produces a high-dimensional working vector 304 (dimension=W).

In various embodiments, a multi-winner-take all (soft-thresholding) algorithm is used to convert the working pre-image 301 to the sparse-coded binary working vector 304. Specifically, a fixed number, w, of the largest values are selected (with ties being selected at random) and set to one, with the remainder set to zero. This produces a W-dimensional binary working vector 304 that is a w-of-W code. Proceeding rightward in the figure, the working vector 304 is multiplied by the data matrix 306 to produce an M-dimensional data-pre-image vector 308, and soft-thresholding is use to converted it to the output (the data vector 310) as a sparse N-of-M code.

Storing an association may include using a prototype to generate the working vector 304, and the association between the working vector 304 and the data vector 310 is stored in the data matrix 306.

Figure 4:
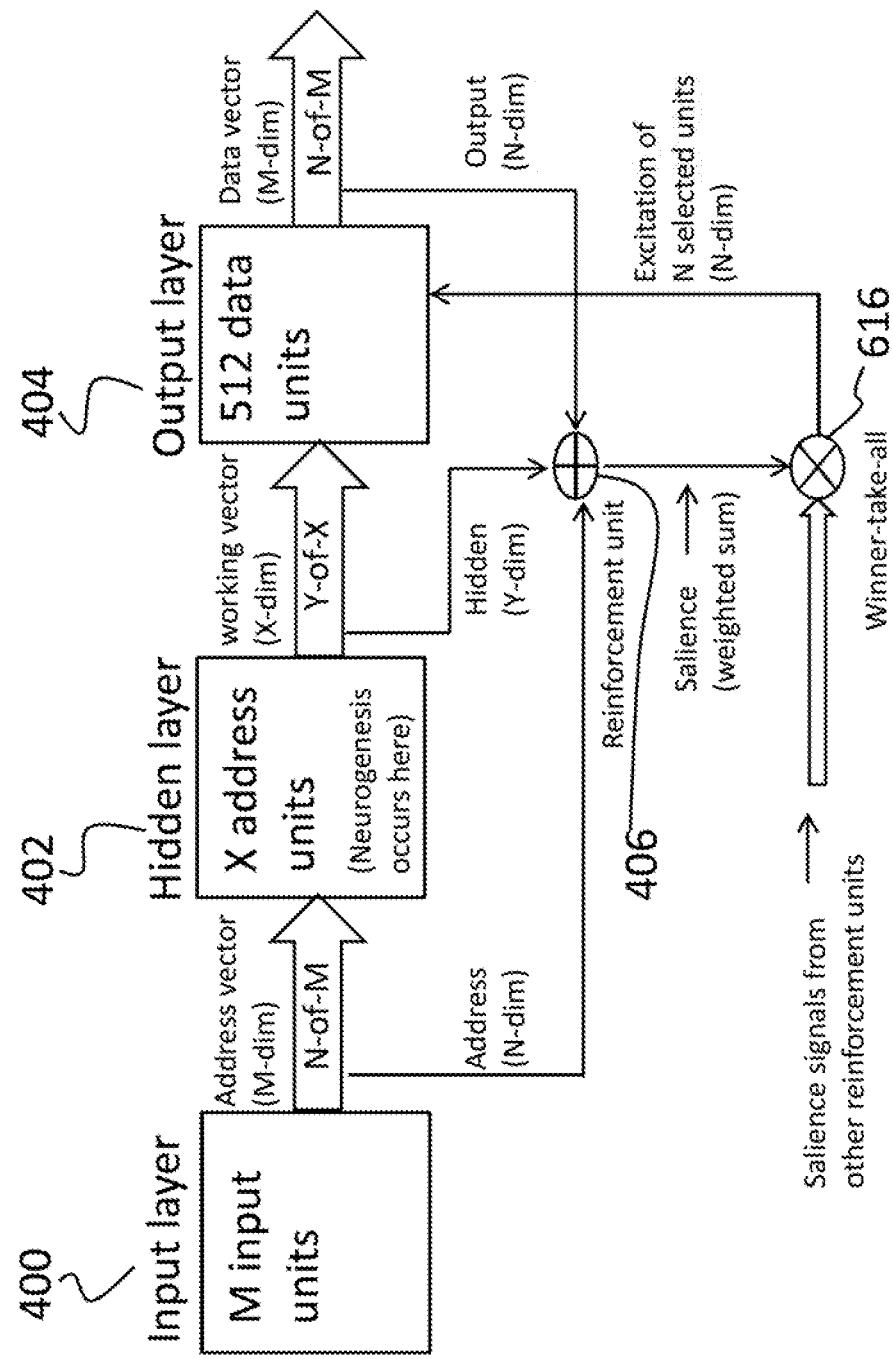
FIG. 4 is a high-level schematic of the plastic hyper-dimensional memory according to various embodiments of the present invention.

An example embodiment is depicted schematically in FIG. 4, which is a hyper-dimensional memory system with reinforced neurogenesis. The hyper-dimensional memory system is based on the Furber style memory which is an SDM with three neuronal layers: (1) the input units (in the input layer 400), (2) the hidden X address units (in the hidden layer 402), and (3) the output data units (in the output layer 404). In the work of Furber these are called respectively the address, working, and data units. The embodiment described herein augments this structure with the reinforcement units 406 (described in further detail below), and with neurogenesis (that occurs in the hidden layer 402 and as described in further detail below) which entails the addition and deletion of address units. Both these processes are triggered by a Novelty Detection algorithm (described in further detail below) during the training process. Note that the addition of an address unit increments the dimension Wand removing an address unit decrements it. However, regardless of the value of W the number w in the working code is held constant.

In various embodiments, when an input to the memory is determined to be novel, the association is trained to the data matrix, a reinforcement unit 406 "tuned" to recognize the specific association is added to the set of reinforcement units, and the number of address units (in the hidden layer 402) is increased by a "splitting method" as described below with respect to neurogenesis.

The purpose of adding address units is to grow the memory while balancing the storage load, and the purpose of adding the reinforcement unit 406 is to preserve the memory of the stored association even after a large number of address units are added during subsequent storage of new associations.

In various embodiments, only the address unit having the highest occupancy is split. This keeps the memory stable, virtually eliminating the loss of previously stored items, while also expanding the capacity of the spiking neuronal memory to store new associations as needed. It also balances the memory load over time by keeping individual units from getting overloaded, which has the further benefit of distributing the load broadly across the memory. This makes the individual connections (or bits) within the memory more efficient, and preserves sparseness, thereby preserving the high-resilience to environmental inputs that are incomplete or corrupted by bit-errors.

(4.1) Novelty Detection

Figure 5:
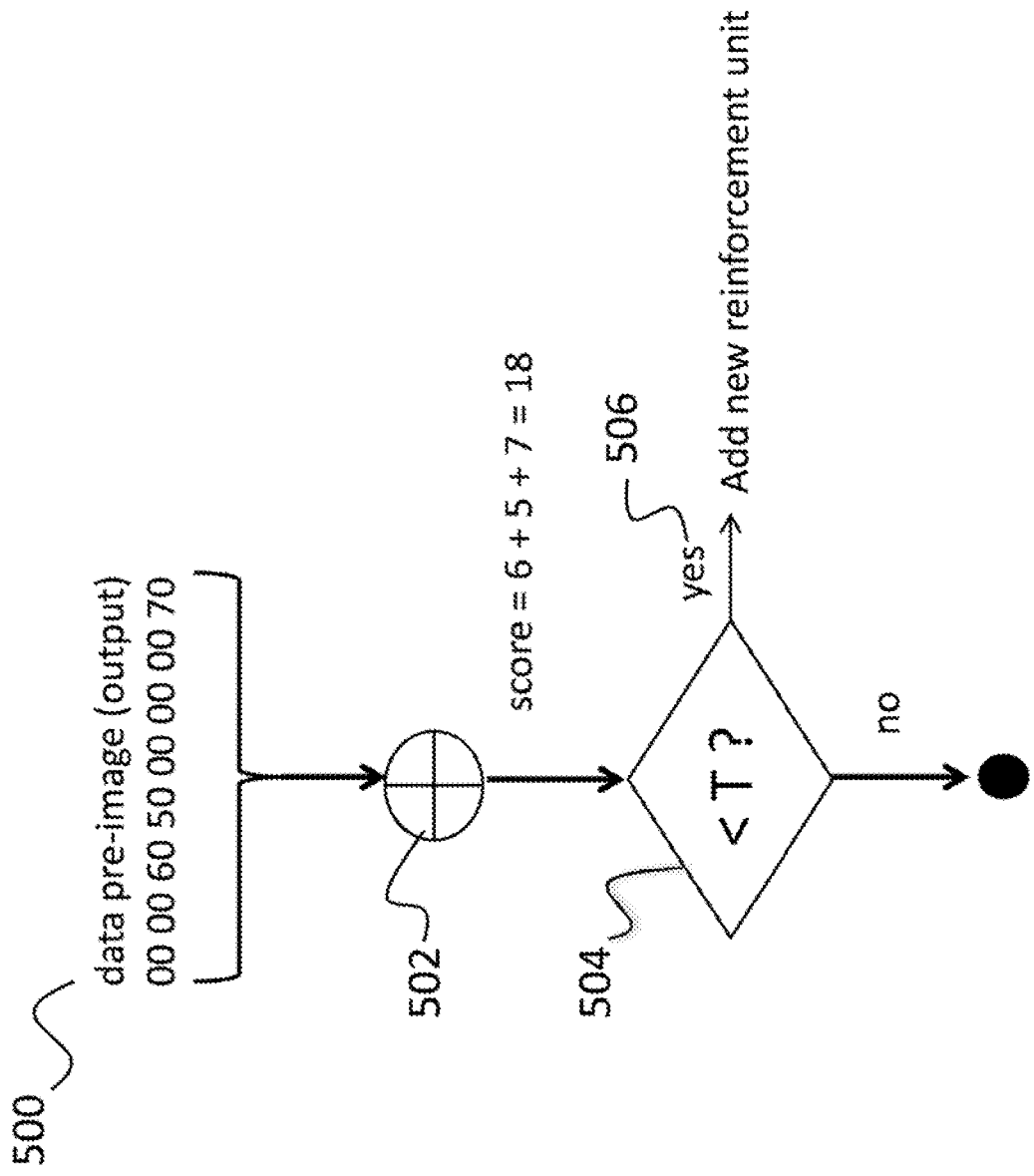
FIG. 5 is an illustration depicting novelty detection as a function of the data pre-image.

In various embodiments and as shown in FIG. 5, when an address vector (numeric input) is presented at the memory input, the novelty detector uses the internally generated data pre-image 500 (depicted as element 308 in FIG. 3). The sum 502 of the pre-image components is computed and compared with a predetermined threshold 504. The pre-image 500 is a vector (e.g., [0, 5, 0, 0, 1, 3]). Thus, the the sum of components in this example would be 0+5+0+0+1+3=9. If the sum 502 is less than 506 the threshold 504, then the address vector is likely to be dissimilar to all those for which an association has been learned. As an alternative (not shown), the response of the winning reinforcement unit (see reinforcement units below) can be compared to the threshold. In other words, the sum is compared with a predetermined threshold in order to decide whether or not to add a new reinforcement unit.

(4.2) Neurogenesis

In various embodiments, every address unit has input connections and output connections. The input connections (in the address matrix) are fixed and sample the input vector, the output connections (in the data matrix) are modifiable and connect into the data units. An output connection from an address unit can be considered to be an input connection from the corresponding data unit's point of view. Such a connection represents the core of the memory. Originally all such connections are initialized to zero before any training has been performed, but each can be changed to a one during training using the outer-product rule. The percentage of an address unit's output connections that have been set to one is called the unit's occupancy. The overall percentage of such connections in the entire data matrix is called the matrix occupancy, or simply occupancy.

In various embodiments, when a novel stimulus is detected during training, the address unit with the highest occupancy is selected for replacement with two new units. Occupancy refers to the number of input-output associations that a particular address unit is involved in storing. Using a "splitting method", the set of input connections to the original unit is divided in half (using random selection) to form 2 disjoint sets of connections, and each new unit is assigned one them. The remainder of the connections for the new units are assigned randomly, and thereafter fixed. Similarly, each of the new units may also acquire a predetermined percentage of the original unit's output connections. However, current simulations have simply dropped the output connections of the original unit, leaving the storage provided by the new address units empty and usable for subsequent storage of new associations.

In various embodiments, the classification performance of the memory may degrade slightly due to removal of the original unit and separately due to its replacement by new units. The impact may be relatively small due to the fact that the memory is hyper-dimensional and so has thousands of address units. This may mean there is enough redundancy in the storage of the patterns that the memory is resilient to the loss of old units and the addition of new (untrained) ones. However, simulations have demonstrated that adding/removing units over time degrades performance, and a mechanism for reinforcing the memory previously stored associations is required to keep the memory functional.

(4.3) Reinforcement Units

Figure 6:
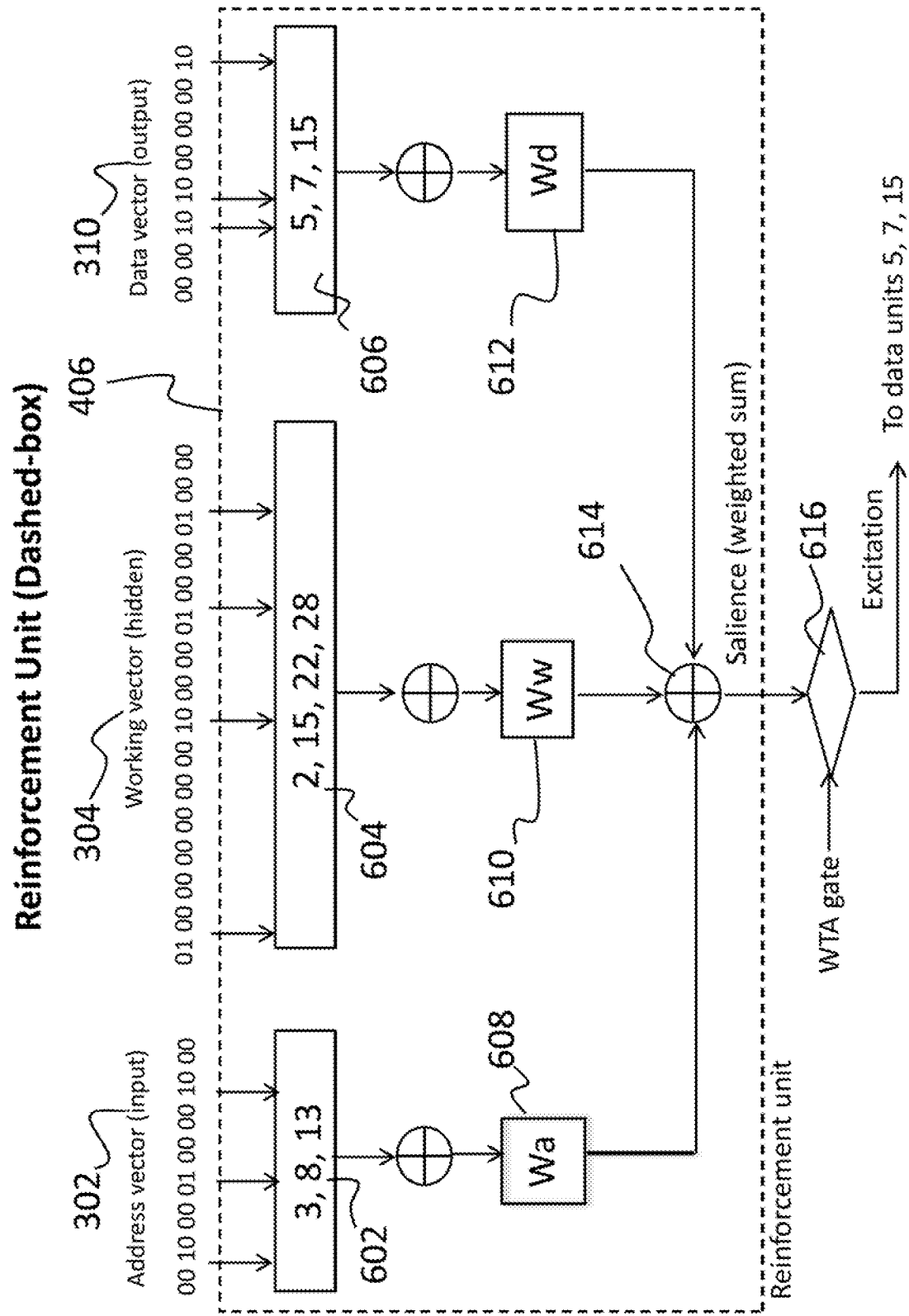
FIG. 6 is an illustration depicting the internal structure of reinforcement unit according to various embodiments of the present invention.

In accordance with various embodiments, FIG. 6 depicts a reinforcement unit 406, which is added to the memory whenever a novel address vector 600 is presented to the memory's input during training. The address vector 600 is detected as being "new" by the novelty detector (shown in FIG. 5), which triggers the creation of the new reinforcement unit 406 with three input "ports" and a single output vector. The three input ports (address port 602, working port 604, and data port 606) are created with fixed weights to sample only the currently active elements of the address vector 302, the working vector 304, and the data vector 310, respectively. Whenever numeric inputs (e.g., an address vector 302) is presented to the input of the memory (and received in the port 602), the working 304 and data 310 vectors are calculated and placed on the reinforcement unit's ports (604 and 606, respectively). This results in a score for each vector in terms of how well it matches the port connections. These three scores are weighted via the weights Wa 608, Ww 610, and Wd 612, and summed 614 to get an overall score.

In various embodiments, the WTA gate (for winner-take-all) 616 indicates that only the highest scoring reinforcement unit is allowed to send its score as an auxiliary excitation signal to the input of each of the data units (shown in the output layer 404 in FIG. 4). The data units that are allowed to receive this input are only those that were active when the reinforcement unit 406 was created. The signal boosts each unit's contribution to the pre-image data vector (depicted as element 308 in FIG. 3), and so enhances the probability that the corresponding bit it will be set to one when the soft-threshold 309 is applied.

In the simulations, various combinations of weights were used, though the value of Wa should generally be set to zero so that the memory is only sampling its internal state. In contrast, setting Wa to one and the other weights to zero gives the best performance (99-100%), but in this case the reinforcement units are acting as the memory independently of the data matrix.

In various embodiments, the splitting process has as a feature, the requirement that an address unit be deleted once it is made to split. This removes address units that are overloaded and over-expressed-preserving memory sparseness and the resilience of the response vectors. Biologically, it mimics the birth-death (life-cycle) of neural units, which may be an essential feature of human leaning and re-factoring of information learned from past experience.

(5) Simulation Test Results

To demonstrate the system, simulations were run as follows. The input and output were 512-dimensional vectors, and set to a 8-of-512 code. A set of 200 prototype-target pairs of randomly generated bit-vectors were used as "seeds" to generate the rest of the training set. Another set of prototype-target pairs was created by generating for each seed prototype the number X of new prototypes that were near to the seed (hamming distance of 4 bits), and another number Y of prototypes that were farther from the seed (hamming distance of 6 bits). The targets were generated similarly and in a corresponding fashion. Namely, when a new prototype was generated from a seed prototype, the seed's target was used as a seed to generate the new target for the new prototype using the same hamming distance from the seed target. The tests used X=0 and Y=8, resulting in a set of 1800 prototype-target pairs (data vectors).

During training, each prototype was trained to its target 40 times: The first 20 times the prototype was perturbed in 2 randomly chosen bit positions, and for the second 20 times, it was perturbed by 3 bits. Bit-vector perturbation was performed by selecting a single bit having the value one and swapping its position with a zero bit in the vector. This resulted in 40×1800=72000 training cycles.

Beginning with a population of 4096 address units, and using dynamic training (neurogenesis allowed during training) with a particular occupancy threshold (e.g., approximately 9%), the population grew to 11647 address units by the end of training. For static tests (no neurogenesis during training), the number of address units was fixed at either 4096 or at 11647, the latter number was determined by the dynamic test.

During testing, each of the 1800 prototypes was perturbed progressively to introduce from 0 to 8 bit errors using the bit-swapping process described above. For a particular number of bit errors, each prototype was perturbed by that number of bits, and then presented to the memory. The output was calculated and matched against the 1800 data vectors using the hamming distance. If the closest target was the one corresponding to the perturbed prototype, then the response was tallied as "correct". In this way, the percentage correct over all trained prototypes was determined as a function of the number of bit errors.

If no reinforcement units are used, then the performance of the memory was determined as:

1. Static with 11647 address units: approximately 85%
2. Static with 4096 address units: approximately 75%
3. Dynamic starting with 4096 units, ending at 11647 units: approximately 55%

The tests also show that even when a very small code is used, specifically an 8-of-512 code at the input and output, the performance of the memory was largely immune to up to 4 or 5 bit errors at the input. When the dynamic memory is endowed with reinforcement units that sample the working and data vectors, it achieves about 90% accuracy.

Two other statistics weighted the performance with respect to how recently a prototype-target pair was trained. One weighted the performance more heavily for pairs that were recently trained, and the other did to opposite. All tests showed a bias toward more recently learned pairs, but the disparity was only about 5 percentage points, and even less when using reinforcement units.

Figure 7:
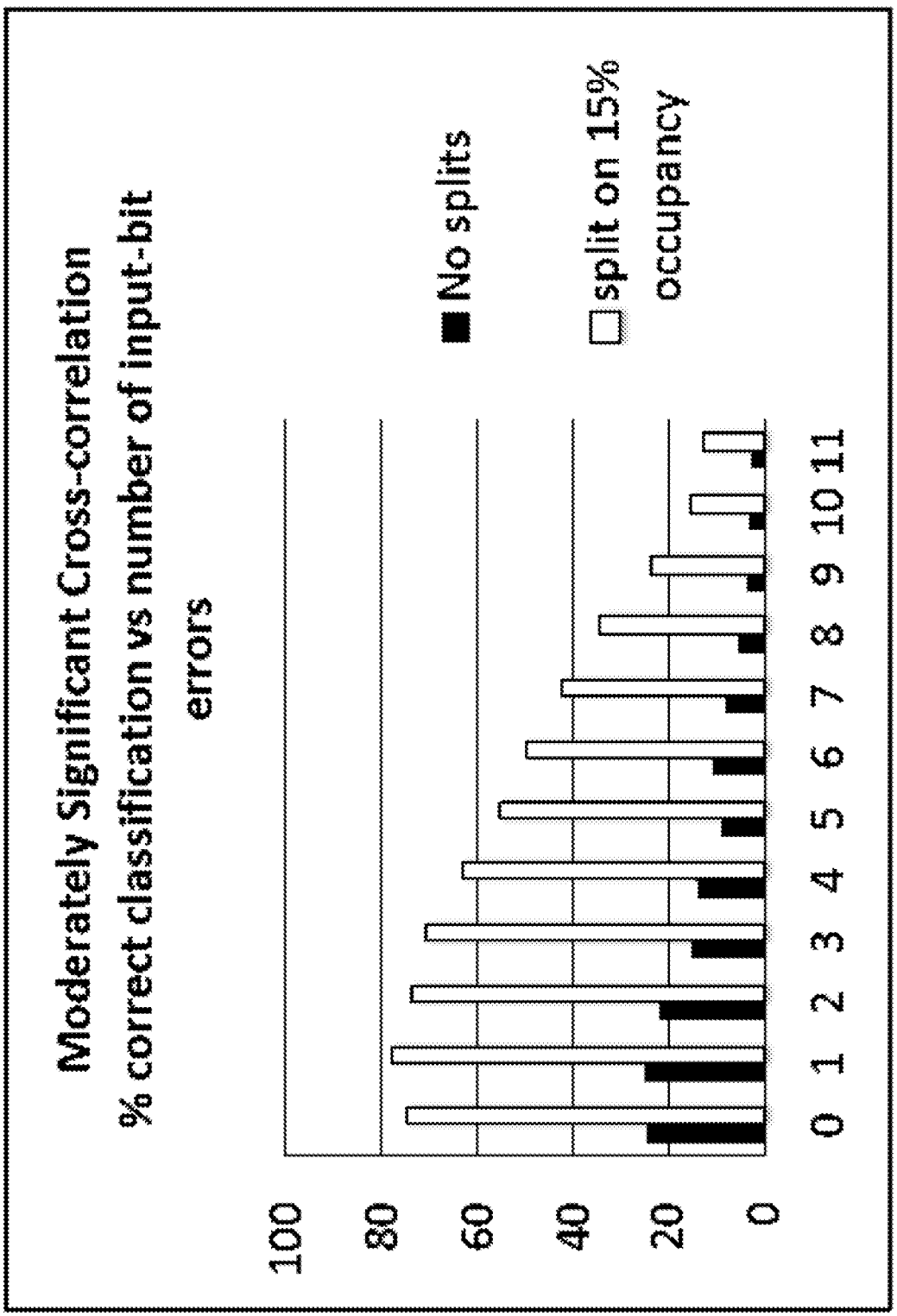
FIG. 7 is a graph depicting test results for a small training set and a modest inter-correlation between input prototypes.
Figure 8:
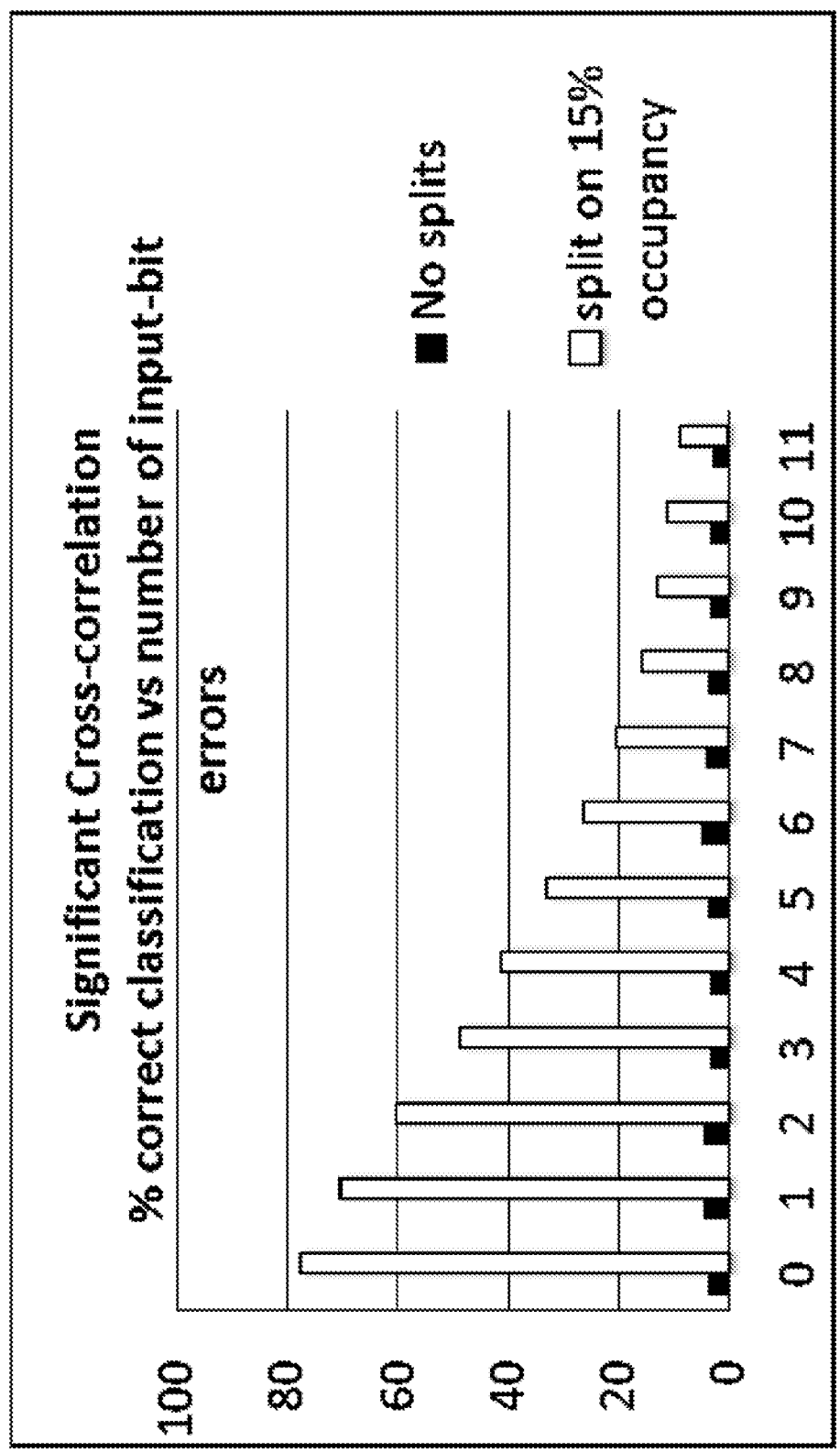
FIG. 8 is a graph depicting test results for a small training set and a significant inter-correlation between input prototypes.

As a comparison, the above tests were performed using neurogenesis, but without the creation of reinforcement units. In FIGS. 7 and 8, the performance is shown as a function of the number of bit-errors at the input. The white bars indicate performance using neurogenesis, and the black bars indicates a static test in which the number of address units was fixed at 4096. Note that the former is much better than the latter, especially in FIG. 8 which shows the case in which prototypes are generated with more cross-correlation. However, the number of prototypes storable for this level of performance is greatly reduced in comparison with the previous cases in which reinforcement units were used.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A plastic hyper-dimensional memory system having neuronal layers, comprising:
    an input layer for receiving an input;
    an address matrix for generating a working pre-image vector from the input;
    a hidden layer for transforming the working pre-image vector into a W-dimensional binary working vector;
    a data matrix for transforming the W-dimensional binary working vector into a M-dimensional data pre-image vector by multiplying the data matrix by the W-dimensional binary working vector to generate the M-dimensional data pre-image vector, the hidden layer performing neurogenesis when a novel input is detected based on the working pre-image vector, where the neurogenesis comprises adding or deleting address units;
    an output layer that generates a data vector based on the M-dimensional data pre-image vector; and
    a set of reinforcement units for novelty detection.

2. The plastic hyper-dimensional memory system as set forth in claim 1, wherein the system includes a novelty detection algorithm, such that when an input is determined to be novel, an association between a working vector and data vector is trained to the data matrix, with a reinforcement unit tuned to recognize the association being added to the set of reinforcement units.

3. The plastic hyper-dimensional memory system as set forth in claim 2, wherein when an input is determined to be novel, a number of address units in the hidden layer is increased.

4. The plastic hyper-dimensional memory system as set forth in claim 3, wherein when the number of units in the hidden layer is increased, an address unit with a highest occupancy level is selected for replacement with two new units, such that a set of input connections to the original address unit is divided in half to form two disjoint sets of connections, and each new address unit is assigned one of the sets of connections.

5. The plastic hyper-dimensional memory system as set forth in claim 3, wherein the input is an address vector.

6. A method for storing new associations using a plastic hyper-dimensional memory system, comprising acts of:
    receiving, in an input layer, an input;
    generating, with an address matrix, a working pre-image vector from the input;
    transforming, with a hidden layer, the working pre-image vector into a W-dimensional binary working vector;
    transforming, with a data matrix, the W-dimensional binary working vector into a M-dimensional data pre-image vector by multiplying the data matrix by the W-dimensional binary working vector to generate the M-dimensional data pre-image vector, the hidden layer performing neurogenesis when a novel input is detected based on the working pre-image vector, where the neurogenesis comprises adding or deleting address units; and
    generating, with an output layer, a data vector based on the M-dimensional data pre-image vector.

7. The method as set forth in claim 6, further comprising an act of determining if an input is novel, such that when an input is determined to be novel, an association between a working vector and data vector is trained to the data matrix, with a reinforcement unit tuned to recognize the association being added to a set of reinforcement units.

8. The method as set forth in claim 7, wherein when an input is determined to be novel, further performing an act of increasing a number of address units in the hidden layer.

9. The method as set forth in claim 8, wherein when the number of units in the hidden layer is increased, further performing an act of selecting an address unit with a highest occupancy level for replacement with two new units, such that a set of input connections to the original address unit is divided in half to form two disjoint sets of connections, and each new address unit is assigned one of the sets of connections.

10. The method as set forth in claim 9, wherein the input is an address vector.

11. A computer program product for storing new associations using a plastic hyper-dimensional memory system, the computer program product comprising:

a non-transitory computer-readable medium having executable instructions encoded thereon, such that upon execution of the instructions by one or more processors, the one or more processors perform operations of:

receiving, in an input layer, an input;

generating, with an address matrix, a working pre-image vector from the input;

transforming, with a hidden layer, the working pre-image vector into a W-dimensional binary working vector;

transforming, with a data matrix, the W-dimensional binary working vector into a M-dimensional data pre-image vector by multiplying the data matrix by the W-dimensional binary working vector to generate the M-dimensional data pre-image vector, the hidden layer performing neurogenesis when a novel input is detected based on the working pre-image vector, where the neurogenesis comprises adding or deleting address units; and generating, with an output layer, a data vector based on the M-dimensional data pre-image vector.

12. The computer program product as set forth in claim 11, further comprising an operation of determining if an input is novel, such that when an input is determined to be novel, an association between a working vector and data vector is trained to the data matrix, with a reinforcement unit tuned to recognize the association being added to a set of reinforcement units.

13. The computer program product as set forth in claim 12, wherein when an input is determined to be novel, further performing an operation of increasing a number of address units in the hidden layer.

14. The computer program product as set forth in claim 13, wherein when the number of units in the hidden layer is increased, and further comprising an operation of selecting an address unit with a highest occupancy level for replacement with two new units, such that a set of input connections to the original address unit is divided in half to form two disjoint sets of connections, and each new address unit is assigned one of the sets of connections.

15. The computer program product as set forth in claim 14, wherein the input is an address vector.

* * * * *